United States Patent [19]

Malaviya

[11] 3,870,900

[45] Mar. 11, 1975

[54] PHASE DISCRIMINATOR HAVING UNLIMITED CAPTURE RANGE

[75] Inventor: Shashi D. Malaviya, Fishkill, N.Y.

[73] Assignee: International Business Machines Corporation, Armonk, N.Y.

[22] Filed: Nov. 12, 1973

[21] Appl. No.: 415,054

[52] U.S. Cl.................. 307/232, 307/233, 328/133, 328/155

[51] Int. Cl.......................... H03d 13/00, H03k 5/20

[58] Field of Search.................... 328/133, 134, 155; 307/232, 233

[56] References Cited

UNITED STATES PATENTS

| | | | |
|---|---|---|---|
| 3,413,492 | 11/1968 | Schneider | 307/232 X |
| 3,430,148 | 2/1969 | Miki | 328/133 |
| 3,441,342 | 4/1969 | Ball et al. | 328/155 X |
| 3,469,198 | 9/1969 | Madsen | 328/133 X |
| 3,588,710 | 6/1971 | Masters | 328/133 |
| 3,714,463 | 1/1973 | Laune | 328/134 X |
| 3,742,249 | 6/1973 | Gerlach et al. | 307/232 |
| 3,798,556 | 3/1974 | Ooya | 307/233 X |

*Primary Examiner*—John Zazworsky
*Attorney, Agent, or Firm*—Thomas F. Galvin

[57] ABSTRACT

A phase discriminator, for operation in a phase-locked loop, which is characterized by a virtually infinite capture range. The discriminator comprises circuit means responsive to the input data and clock pulses for generating a signal having a duration indicative of the phase difference between the pulses, a flip-flop which identifies the phase relationship between the pulses, and a current switch circuit responsive to the flip-flop output for generating an output pulse having a potential level indicative of the phase relationship between the input pulses, and responsive to the circuit means for generating the output pulse for a duration proportional to the phase difference between them. The circuit is also capable of locking pulses of widely different frequencies and tolerates a large variation of input pulse widths.

19 Claims, 7 Drawing Figures

PHASE DISCRIMINATOR HAVING UNLIMITED CAPTURE RANGE

CROSS-REFERENCE TO A RELATED APPLICATION

This application is related to an application of S. D. Malaviya et al entitled "Master-Slave Binary Divider Circuit," Ser. No. 319,121 filed Dec. 29, 1972, and assigned to the same assignee as the present application. The referenced application is hereby incorporated by reference in this application.

DESCRIPTION OF THE PRIOR ART

1. Field of the Invention

The present invention relates to phase discriminators or phase comparators which are particularly useful for operation in phase-locked loops.

2. Background of the Prior Art

Phase-locked loops have been used for many years, most widely in a variety of applications in data processing, instrumentation and space telemetry. Until recently, their applications have been limited to precision measurements requiring a high degree of noise immunity and very narrow band widths.

The advent of monolithic integrated circuit technology has made it possible to substantially reduce the cost and complexity of these systems, thereby increasing their potential as tools for use wherever digital or AC signals are encountered.

All commercially available phase discriminators have inherent limitations which have hindered or prevented their use in many systems where they would ordinarily be desirable. The primary limitation is the limited "capture range." This term refers to the range of frequency of an input signal which can be locked in by the phase-locked loop. In most present systems, when the difference in frequency between the input signals exceeds the capture range there is a significant loss of the DC component in the error signal which prevents synchronization.

In addition to a limited capture range, the conventional commercially available balanced switch type of phase discriminator operates effectively only when the reference and controlled input waveforms have 50 per cent duty cycles; in addition when the two waveforms are locked-in, they are 90° out of phase. Moreover, these circuits require critically matched resistors or other components to operate effectively.

SUMMARY OF THE INVENTION

It is therefore an object of my invention to provide a phase discriminator with virtually infinite capture range.

It is a further object of my invention to achieve this type of operation using standard circuit components which are easily manufactured in monolithic integrated circuit form.

It is yet another object of my invention to discriminate the phase difference of input waveforms which have a potentially wide range of duty cycles.

The phase discriminator of my invention comprises circuit means responsive to the input pulses for generating an output signal having a duration indicative of the phase difference between the pulses; logic means responsive to the input pulses for generating an output signal identifying the phase relationship between the pulses; and current switch means responsive to the logic means for generating an output pulse having a potential level indicative of the phase relationship between the input pulses, and responsive to the circuit means for generating said output pulse for a duration proportional to the phase difference between them.

In the preferred embodiment, the current switch means includes a pair of error transistors and a current source connected to the emitters of the error transistors. The logic means is a flip-flop which renders the error transistors conductive alternately depending on the phase relationship between the input pulses. The circuit means includes a binary divider which renders the current source transistor conductive only for a duration proportional to the phase difference between the pulses.

Irrespective of the difference in frequency between the two signals, the DC component of the differential output from the switching transistors is of the correct polarity to act as an error signal for pulling the clock pulses of a control variable frequency oscillator (VFO) into synchronism with the reference signal.

Thus, my invention acts both to lock in the frequency as well as the phase of one set of signals to another set. Such circuits are commonly termed phase and/or frequency discriminators.

Moreover, although the following description describes my invention in terms of pulse waveforms, it is suitable for handling a variety of waveforms, e.g., sinusoidal (AC), trapezoidal, etc.

DESCRIPTION OF THE PREFERRED EMBODIMENT

Figure 1:
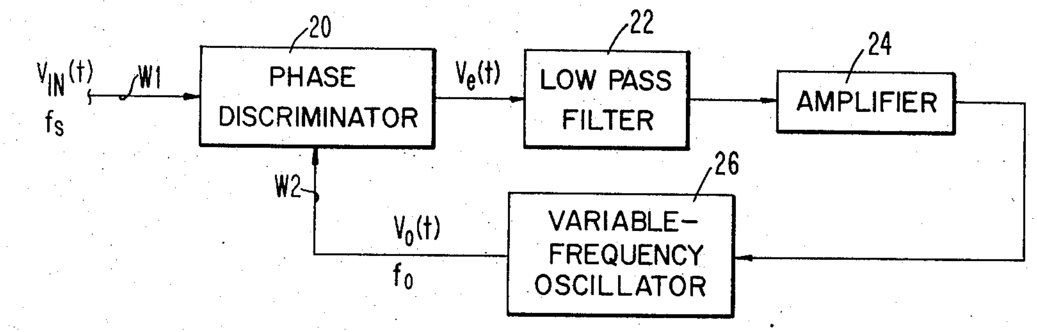
FIG. 1 illustrates a phase-locked loop of conventional design in which my inventive circuit finds practical application.

The phase-locked loop system illustrated in FIG. 1 is of quite conventional design and is discussed in the present application only to serve as a reference point for my invention. The illustration of this system is not to be construed that my invention is limited to operation in such a system.

The standard phase-locked loop consists basically of three parts: the phase discriminator, a low pass filter, an amplifier and a variable frequency oscillator, VFO, also commonly referred to as a voltage controlled oscillator.

As shown in FIG. 1, the phase-locked loop comprises phase discriminator 20 which is responsive to the difference in phase between an input reference signal, denoted as W1 having potential$V_{in}(t)$ and frequency $f_s$, and a pulse W2 having potential $V_o(t)$ and frequency $f_o$ from variable frequency oscillator 26. The VFO is controlled by an error voltage, $V_e(t)$, generated by phase discriminator 20 which is filtered by low pass filter 22 and amplified by error amplifier 24. The error signal $V_e(t)$ from discriminator 20 has a positive or negative value indicative of whether input square pulse W1 leads or lags in phase pulse W2.

When there is no signal W1 applied to the system, the error voltage $V_e(t)$ is equal to zero. The VFO operates at a set frequency, commonly known as the "free-running frequency." If an input signal W1 is applied to the system, the phase discriminator 20 compares the phase and the frequency of the input with the VFO frequency and generates an error voltage $V_e(t)$ that is related to the phase and/or the frequency difference between the two signals. This error voltage is then filtered, amplified and applied to the control terminal of the VFO. This voltage forces the VFO frequency to vary in the direction that reduces the frequency difference between W2 and W1.

In most prior art phase-locked loops, successful operation depends upon whether the input frequency is sufficiently close to the frequency of W2 to permit the VFO signal to synchronize or "lock" with the incoming signal. The range of frequencies over which the phase-locked loop can acquire lock with an incoming signal is known as "capture range" of the system. As already noted, in most prior art systems, the capture range has always been limited to a relatively narrow frequency band.

Figure 2:
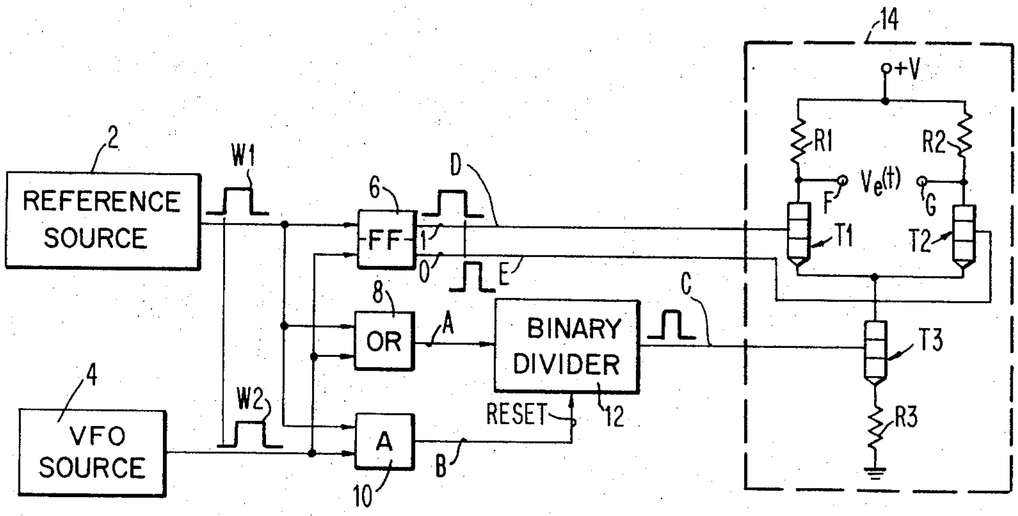
FIG. 2 is a circuit diagram of the present invention.

Turning now to FIG. 2, the preferred embodiment of my phase discriminator comprises a flip-flop 6, OR gate 8 and AND gate 10 having inputs connected to a reference source 2 and VFO source 4. These sources generate pulses W1 and W2. In a data processing system, for example, pulses W1 may be data pulses and pulses W2 may be local clock pulses. VFO source 4 corresponds to the variable frequency oscillator 26 in FIG. 1 but may also be any source of a signal, the frequency of which is controlled by an error voltage. Reference source 2 may be a myriad of sources on which it is desired to lock the VFO signal W2. Besides a local clock signal, W2 may be a low frequency signal such as a 60 Hz power line signal or an RF signal in the MHz range.

The phase discriminator also comprises a binary divider 12 and current switch circuit 14 which includes a pair of transistors T1 and T2 having their emitters connected to a current source transistor T3. Current switch 14 is conventional in the logic art. It functions as a means for generating output pulses of mutually opposite phase responsive to input signals at the bases of T1 and T2. The error voltages indicative of the phase difference between reference source 2 and VFO source 4 are taken from terminals F and G at the collectors of transistors T1 and T2, respectively. Thus, $$(1)\ V_e(t) = V_G(t) - V_F(t)$$

The outputs from flip-flop 6 are connected to the base terminals of transistors T1 and T2, thereby controlling the conduction of the transistors in alternate fashion.

The output of OR gate 8 comprises the first input to divider 12; and the output of AND gate 10 comprises the reset input of divider 12. The output from divider 12 is connected to the base terminal of transistor T3, thereby controlling the operation of the current switch circuit 14. The combination of OR gate 8, AND gate 10 and divider 12 functions as means for generating a signal having a duration equal to the delay between pulses. It will be appreciated by those of skill in the art that each of the components illustrated in FIG. 2 is of standard design and is commercially available in discrete form. A divider circuit which performs very well in this phase discriminator is described in my copending application entitled Master-Slave Binary Divider Circuit, filed Dec. 29, 1972, Ser. No. 319,121. This application is hereby incorporated by reference in the present application.

In addition, the circuit shown in FIG. 1 is easily manufacturable on a single monolithic integrated circuit semiconductor chip by using modern techniques.

Qualitatively, the operation of the preferred embodiment of my invention illustrated in FIG. 2 is as follows: Assume that input from reference source 2, W1, becomes positive at a time earlier than pulse W2, the delay being denoted as $\Delta t$. The output at node A of OR gate 8 becomes positive and remains so for the duration of both pulses. The output at node B of AND gate 10 goes positive only during the overlapping duration of pulses W1 and W2. divider 12 is of the reset dominant type and is reset (output C in the down state) by the output of AND gate 10, irrespective of the output of OR gate 8. Thus, assuming that divider 12 is initially in the reset state, it generates an output only during the interval when pulse W1 leads W2. The output from divider 12 controls the conduction of transistor T3, which in turn provides current to switching transistors T1 and T2. Therefore, current switch circuit 14 is switched on only during the interval in which pulse W1 leads pulse W2.

Flip-flop 6 operates in conventional fashion as means for generating a pair of signals on output lines D and E having substantially equal and opposite waveforms. These outputs change state in response to changes on the S and R inputs. Thus, because pulse W1 from reference source 2 goes positive before pulse W2, flip-flop 6 is in its set state and generates a positive output on line D. This output signal is applied to the base of transistor T1 and renders it conductive.

Because the output of divider 12 at node C is also up at this time, the current switch circuit 14 is conducting through the path of transistors T3 and T1; and a negative output pulse is generated at terminal F. When the output from VFO source W2 goes positive, both the set and reset lines of flip-flop 6 become positive simultaneously and the output levels at lines D and E are indeterminate. However, since divider 12 is turned off by means of a reset pulse from AND gate 10 when both pulses W1 and W2 are positive, this indeterminancy is immaterial because no output can appear across terminals F or G. In addition, small amplitude variations in the outputs of flip-flop 6 have no effect on the amplitude of the outputs at terminals F and G because T3 is a constant current source.

Thus, the width of the output pulse $V_e$ at terminal F or G is proportional to the delay between the two input waveforms W1 and W2. It should be clear that if W2 had been leading W1, then the output pulse would have appeared at node G instead of node F. Moreover, the trailing edges of waveforms W1 and W2 have no effect on the width or the amplitude of the output pulses; and the circuit is insensitive to the value of the input pulse widths per se.

The foregoing qualitative analysis has considered the case where the two input waveforms are partially overlapping and where the frequency difference between them is small. However, the circuit is also effective for pulses having a wide divergence in frequency - referred to as a virtually infinite capture range. If, for example, the frequency of pulse W1 were much greater than that of W2, the average voltage at terminal F would be lower, i.e., more negative than at terminal G. The DC component of the differential output across terminals F and G would then have the correct polarity for pulling a VFO back into synchronism with the reference signal.

The operation of my invention can be appreciated better by referring to the timing diagrams of FIGS. 3, 4, 5 and 6 which offer a more precise explanation than has been given heretofore.

Figure 3:
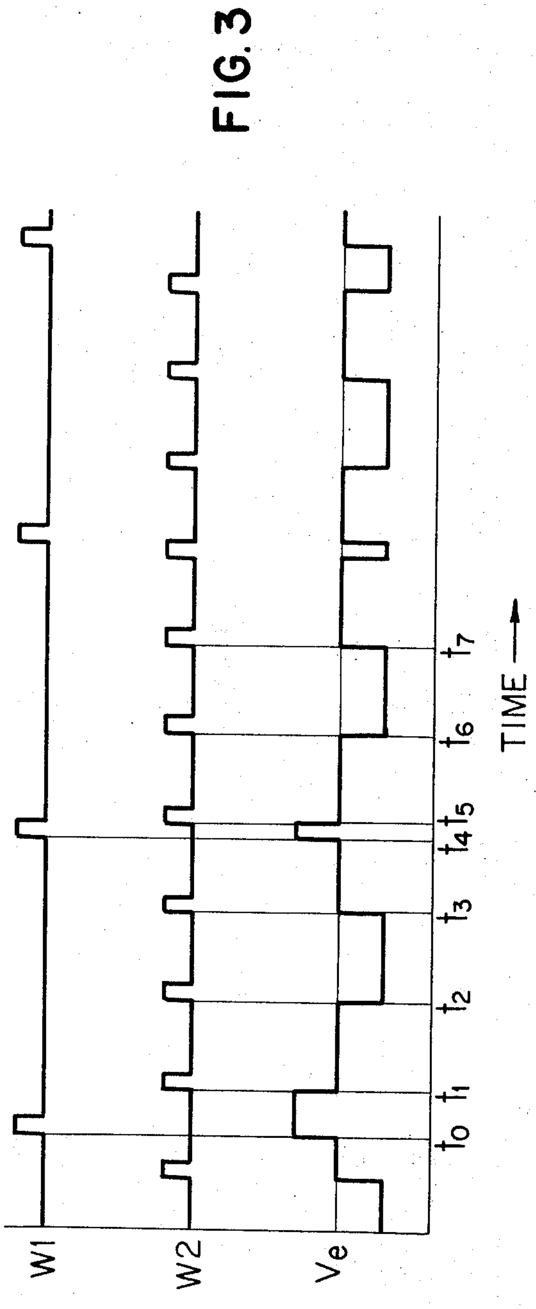
FIGS. 3, 4 and 5 are pulse timing diagrams of various conditions of the VFO and reference signals which are useful in understanding the operation of the circuit in FIG. 2.

In FIG. 3, the frequency of the input reference square pulse W1 is much less than the frequency of the VFO pulse W2. As noted in equation (1) above, $V_e$ represents the differential output across terminals F and G of the circuit shown in FIG. 2. It is seen that the differential output swings through positive and negative levels about a reference potential, the value of which is dependent on the potential drops within circuit 14. In the present case it may be around 3.0 volts. Beginning at time $t_0$, pulse W1 from reference source 2 acts to set flip-flops 6 to render transistor T1 conductive. At the same time OR circuit 8 gates pulse W1 to binary divider 12 which generates an output signal to render current source transistor T3 conductive. This causes current to flow from +V through transistors T1 and T3 to ground, generating a negative output at terminal F which makes the error signal $V_e(t)$ positive with respect to the reference potential. The differential output continues until time T1 when pulse W2 from VFO source gate appears. The pulse is gated by OR circuit 8 and turns binary divider 12 off. It also resets flip-flop 6 thereby rendering transistor T2 conductive. However, as the signal at node C has been removed from current source transistor T3, no signal can appear at the output terminals F or G. Thus, the differential output is zero.

At time $t_2$ a second pulse is received from pulse source 4 which causes an output signal to be generated from binary divider 12 thereby turning transistor T3 on. As transistor T2 is conductive from the 0 output of flip-flop 6, an output pulse is generated at terminal G. This output terminates when a second pulse is received at time $t_3$ from VFO source 4 which turns the binary divider 12 off. At time $t_4$ divider 12 again generates a pulse in response to the second W1 pulse and it is then turned off by the fifth W2 pulse at $t_5$. At interval $t_6 - t_7$, an output is generated from terminal G responsive to the pulses from VFO source 4.

Viewing the differential output $V_e$ of FIG. 3 in its entirety it is seen that the average output is negative due to the higher repetition rate of the W2 pulses.

Figure 4:
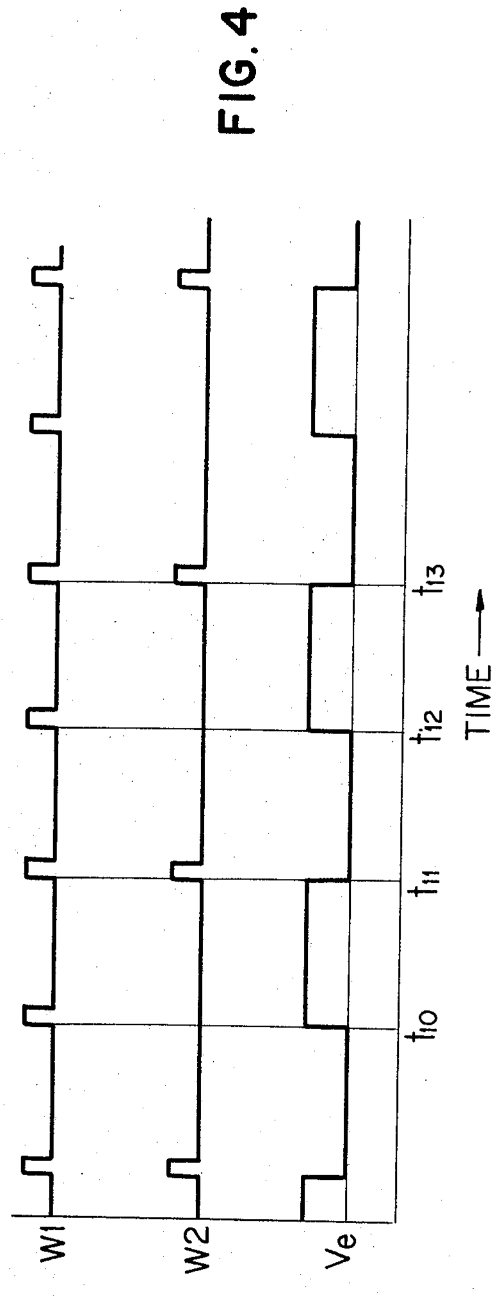

FIG. 4 illustrates the case where the frequency of the VFO source 4 is much less than the frequency of the reference source 2. In the example shown in FIG. 4 the frequency of the W1 pulse is twice that of the W2 pulses and the phase difference between the pulses is zero. Beginning the description of the operation at instant $t_{10}$, binary divider 12 is in the reset state and current switch circuit 14 generates no output. At $t_{10}$ pulse W1 sets flip-flop 6 and causes divider to generate an output, thereby turning on transistors T1 and T3, respectively. Differential output $V_e$ goes positive and remains so until time $t_{11}$. At that point pulses W1 and W2 occur simultaneously, thereby generating outputs from OR gate 8 at node A and AND 10 at node B. As divider 12 is reset dominant, no output is generated from divider 12 and current switch circuit 14 is rendered non-conductive. At this point flip-flop 6, having received pulses on both the set and reset inputs, is in the indeterminate state; however this is of no consequence since transistor T3 is non-conductive. The sequence repeats itself between the interval defined by $t_{12} - t_{13}$ and so on. The differential output is always positive because reference signal W1 is greater in frequency than VFO signal W2.

Figure 5:
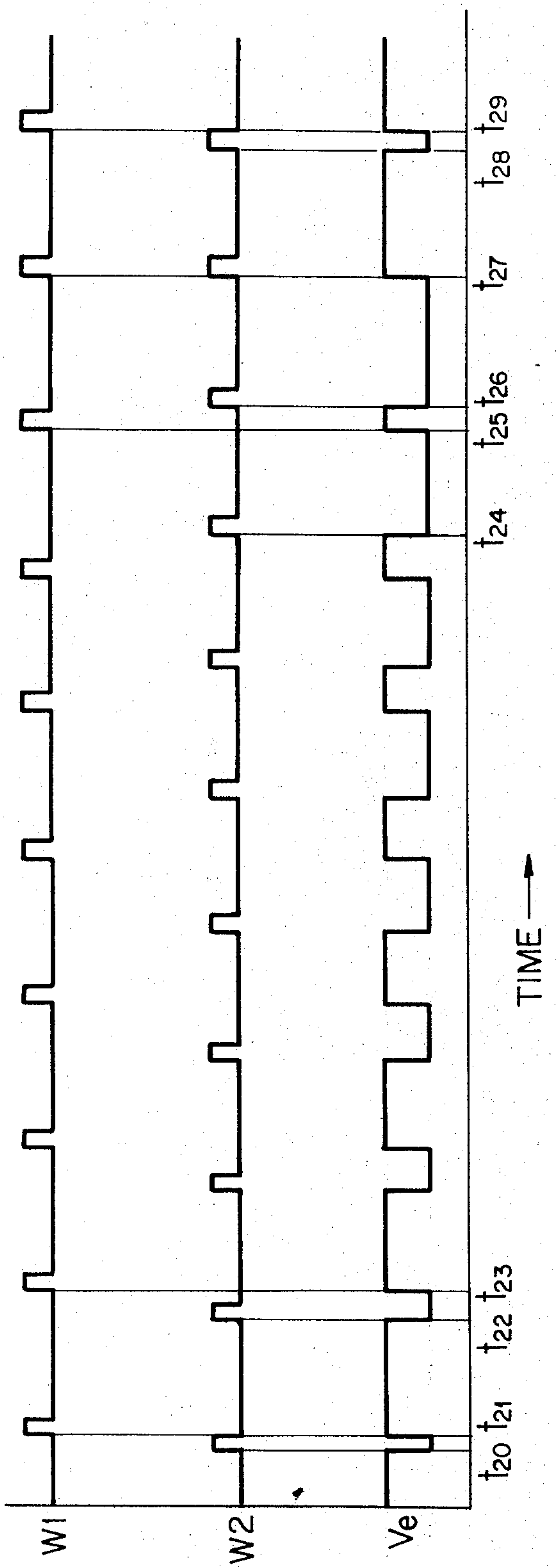

Having considered the situation where the frequency difference between the pulses is very great, FIG. 5 turns to the situation where the frequency difference is rather small. In FIG. 5, the frequency of the VFO source is slightly greater than the frequency of the reference source, $f_{VFO} \cong 1.1\ f_{REF}$. As can be seen in the timing diagram the pulse width of the differential output increases progressively as the reference pulses W1 lag further behind the VFO pulses W2. Thus the interval defined by $t_{22}$–$t_{23}$ is greater than the interval defined by $t_{20}$–$t_{21}$. The differential output pulse widths increase until time $t_{27}$ when the pulses are exactly in-phase. The differential output is then zero, indicating the exact overlapping of the pulses. At $t_{28}$ the cycle begins again, the interval defined by $t_{28}$–$t_{29}$ being equal to the interval defined by $t_{20}$–$t_{21}$.

Figure 6:
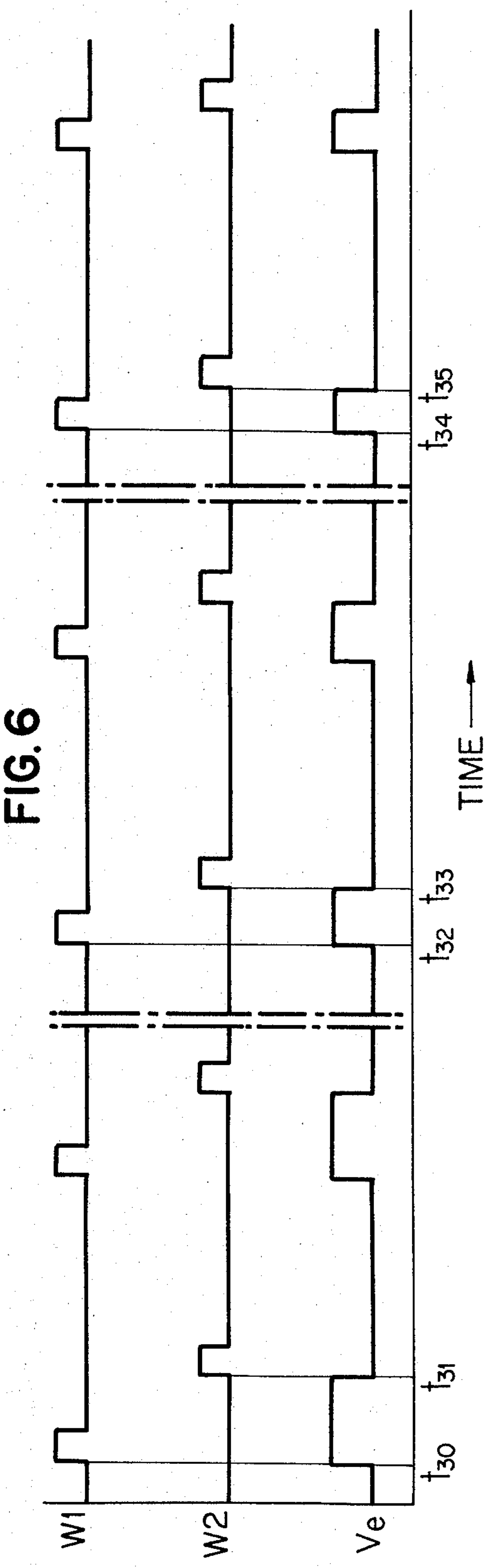
FIG. 6 is a pulse timing diagram of the operation of the phase-locked loop of FIG. 1 which incorporates my inventive circuit.

The preceding three figures have shown the operation of my novel phase discriminator in what might be termed "open-loop" operation. These figures show the operation of the discriminator for various frequencies of the input pulses without any attempt at locking the VFO pulse by means of a circuit similar to that of FIG. 1. FIG. 6 illustrates the "closed-loop" operation in which my phase discriminator is used in the circuit of FIG. 1. In FIG. 6 pulses W1 and W2 are initially of the same frequency but are out of synchronism. At the time $t_{30}$ pulse W1 operates through flip-flop 6 and divider 12 to render transistors T1 and T3 conductive, thereby providing a positive differential output across terminals G and F. At $t_{31}$ transistor T3 is rendered non-conductive when pulse W2 de-energizes divider 12. This differential output signal occurs for a number of input pulses and is filtered in filter 22 and amplified by amplifier 24 to correct the frequency $f_0$ of the signal generated by VFO 26 in FIG. 1. VFO 26 operates to pull pulse train W2 into better synchronism with pulse train W1 based on the average differential output $V_e$. Thus the interval of the differential output defined by $t_{32}$–$t_{33}$ is less than the interval defined by the interval $t_{30}$–$t_{31}$. After another interval, which depends on the system delay introduced by the filter, amplifier and VFO, the synchronization lag between pulse train W2 and W1 is again reduced at $t_{34}$. This action occurs until the differential output at terminal F is reduced to zero and the system is in phase and frequency lock. The differential output will change from positive to negative if the phase of the VFO signals W2 change from lagging to leading. The speed with which the VFO frequency lock occurs is dependent on the system shown in FIG. 1 rather than my novel phase discriminator.

Figure 7:
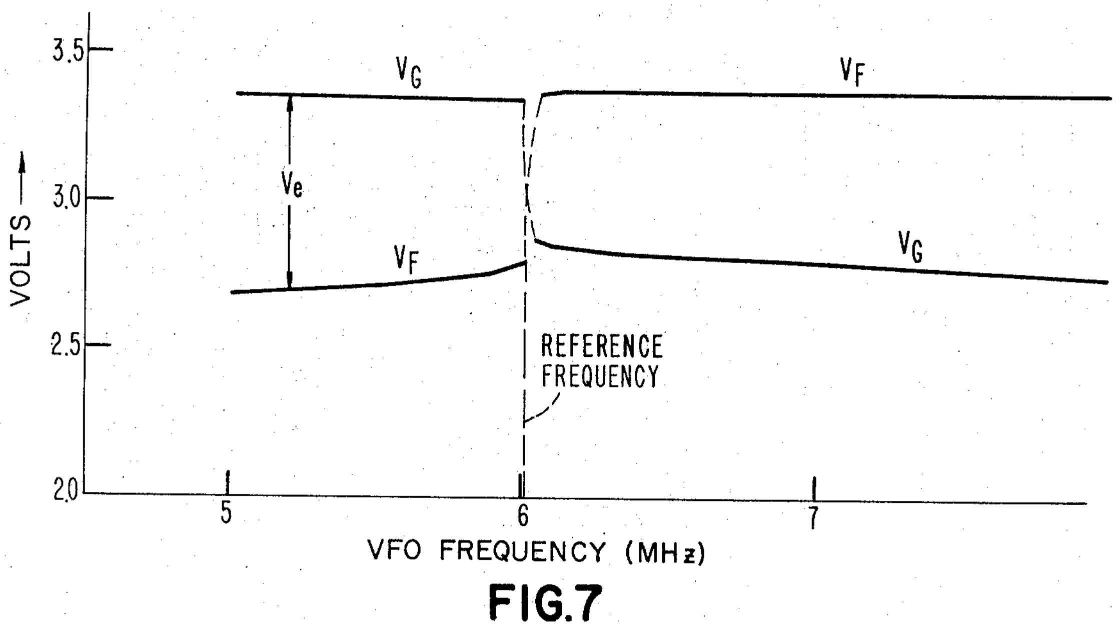
FIG. 7 illustrates the open loop differential output of my inventive circuit when the VFO frequency is swept over a high frequency range.

FIG. 7 illustrates the ability of my system to phase lock at frequencies in the megahertz range, the range which is most difficult to phase-lock effectively in prior art systems. The FIGURE also demonstrates the wide capture range of the discriminator. As illustrated, the VFO frequency source is varied from 5 MHz to above 7 MHz. The reference frequency is at 6.0078 MHz. As the VFO frequency is increased from 5 MHz, the differential output potential $V_e$ remains essentially at its maximum value except for the non-linear saturation characteristic introduced by feed-back amplifier 24. Around the reference frequency, a high sensitivity region is reached in which the output varies rapidly from highly positive to highly negative as the VFO frequency sweeps past the reference frequency. The output thereafter remains essentially at its maximum negative value.

In summary, I have invented a phase discriminator having an essentially infinite capture range which has been successfully constructed and operated using unmatched, off-the-shelf, discrete components. It is designed to also take advantage of integrated circuit design so that the entire discriminator can be easily fabricated on a single semiconductor chip. In addition, unlike conventional phase discriminators which are very sensitive to pulse widths, my circuit can accept any reasonable pulse width, e.g., 5 to 50 percent with no restrictions regarding matching of the two input pulses. The circuit has locked successfully a variable frequency oscillator to a 60 Hz AC power line and has also locked one video signal to another using the horizontal and vertical sync pulses (34 KHz and 60 Hz.) These are only typical applications of the circuit.

The preferred embodiments shown in the drawings and described above are merely illustrative of the many forms which the invention may take in practice. Numerous modifications will readily occur to those skilled in the art without departing from the scope of the invention as described in the following claims:

I claim:

1. A phase discriminator responsive to the delay between two input signals for providing an output waveform indicative both of the relative occurrence of said signals and of the difference in said delay comprising:

circuit means responsive to said input signals for generating an output signal having a duration equal to the delay between said pulses;

logic means responsive to said input signals for generating an output signal identifying the relative occurrence of said signals; and current switch means responsive to said logic means for generating said output waveform having a potential level indicative of the relative occurrence of said input signals, and responsive to said circuit means for generating said output waveform for a duration indicative of the delay between said input signals.

2. A phase discriminator as in claim 1 wherein:

said logic means comprises means for generating a pair of signals having substantially equal and opposite waveforms on a pair of output lines, depending on which of said input signals occurs before the other; and said current switch means includes first and second input terminals adapted to receive said signals, and first and the second output terminals for transmitting respective output waveforms of mutually opposite phase indicative of said relative occurrence.

3. A phase discriminator as in claim 2 wherein said logic means comprises a flip-flop circuit.

4. A phase discriminator as in claim 1 wherein said circuit means comprises:

an AND gate responsive to said input signals for generating an output signal indicative of the simultaneous presence of said input signals;

an OR gate responsive to said input signals for generating an output indicative of the presence of either one of said input signals; and binary divider means, having a first input responsive to said OR gate output signal and a reset input responsive to said AND gate output signal, for generating said circuit means output signal.

5. A phase discriminator as in claim 1 wherein said current switch means comprises:

a pair of error transistors and a current source transistor connected to the emitters of said error transistors;

the control terminals of said error transistors adapted to receive signals from said logic means;

said error transistors having first and second output terminals for transmitting respective electrical signals of mutually opposite phase indicative of said relative occurrence of said input signals; and said current source transistor having an input responsive to said circuit means output signal and supplying current to said error transistors for the duration of said signal.

6. A phase discriminator as in claim 1 wherein:

said logic means comprises a flip-flop circuit; and said current switch means comprises:

a pair of error transistors and a current source transistor connected to the emitters of said error transistors;

the control terminals of said error transistors adapted to receive signals from said logic means;

said error transistors having first and second output terminals for transmitting respective electrical signals of mutually opposite phase indicative of said relative occurrence of said input signals; and said current source transistor having an input responsive to said circuit means output signal and supplying current to said error transistors for the duration of said signal.

7. A phase discriminator as in claim 6 wherein said circuit means comprises:

an AND gate responsive to said input signals for generating an output signal indicative of the simultaneous presence of said input signals;

an OR gate responsive to said input signals for generating an output indicative of the presence of either one of said input signals; and binary divider means, having a first input responsive to said OR gate output signal and a reset input responsive to said AND gate output signal, for generating said circuit means output signal.

8. A phase discriminator responsive to the phase relationship and phase difference between two input pulses comprising:

circuit means responsive to said input pulses for generating an output signal having a duration equal to the phase difference between said pulses;

logic means responsive to said input pulses for generating an output signal identifying the phase relationship between said pulses; and current switch means responsive to said logic means for generating an output pulse having a potential level indicative of the phase relationship between said input pulses, and responsive to said circuit means for generating said output pulse for a duration indicative of the phase difference between said input pulses.

9. A phase discriminator as in claim 8 wherein:

said logic means comprises means for generating a pair of signals having substantially equal and opposite waveforms on a pair of output lines, depending on which of said input pulses is in phase leading relationship with respect to the other; and said current switch means includes first and second input terminals adapted to receive said signals, and first and the second output terminals for transmitting respective output pulses of mutually opposite phase indicative of said phase relationship.

10. A phase discriminator as in claim 9 wherein said logic means comprises a flip-flop circuit.

11. A phase discriminator as in claim 8 wherein said circuit means comprises:

an AND gate responsive to said input pulses for generating an output signal indicative of the simultaneous presence of said input signals;

an OR gate responsive to said input signals for generating an output signal indicative of the presence of either one of said input signals; and binary divider means having a first input responsive to said OR gate output signal and a reset input responsive to said AND gate output signal for generating said circuit means output signal.

12. A phase discriminator as in claim 8 wherein said current switch means comprises:

a pair of error transistors and a current source transistor connected to the emitters of said error transistors;

the control terminals of said error transistors adapted to receive signals from said logic means;

said error transistors having first and second output terminals for transmitting respective electrical signals of mutually opposite phase indicative of the phase relationship between said input pulses;

said current source transistor having an input responsive to said circuit means output signal and supplying current to said error transistors for the duration of said signal.

13. A phase discriminator as in claim 8 wherein:

said logic means comprises a flip-flop circuit; and said current switch means comprises:

a pair of error transistors and a current source transistor connected to the emitters of said error transistors; the control terminals of said error transistors adapted to receive signals from said logic means;

said error transistors having first and second output terminals for transmitting respective electrical signals of mutually opposite phase indicative of the phase relationship between said input pulses;

said current source transistor having an input responsive to said circuit means output signal and supplying current to said error transistors for the duration of said signal.

14. A phase discriminator as in claim 13 wherein said circuit means comprises:

an AND gate responsive to said input pulses for generating an output signal indicative of the simultaneous presence of said input signals;

an OR gate responsive to said input signals for generating an output signal indicative of the presence of either one of said input signals; and binary divider means having a first input responsive to said OR gate output signal and a reset input responsive to said AND gate output signal for generating said circuit means output signal.

15. In a phase-locked loop system including a discriminator means responsive to the phase and frequency difference between two input signals for generating an error signal, and a voltage controlled oscillator responsive to said error signal for reducing said phase and frequency difference, the improvement wherein said discriminator means comprises:

circuit means responsive to said input signals for generating an output signal having a duration equal to the delay between said pulses;

logic means responsive to said input signals for generating an output signal identifying the relative occurrence of said signals; and current switch means responsive to said logic means for generating said error signal having a potential level indicative of the relative occurrence of said input signals, and responsive to said circuit means for generating said error signal for a duration indicative of the delay between said input signals.

16. A system as in claim 15 wherein:

said logic means comprises means for generating a pair of signals having substantially equal and opposite waveforms on a pair of output lines, depending on which of said input signals occurs before the other; and said current switch means includes first and second input terminals adapted to receive said signals, and first and the second output terminals for transmitting respective output waveforms of mutually opposite phase indicative of said relative occurrence.

17. A system as in claim 16 wherein said logic means comprises a flip-flop circuit.

18. A system as in claim 15 wherein said circuit means comprises:

an AND gate responsive to said input signals for generating an output signal indicative of the simultaneous presence of said input signals;

an OR gate responsive to said input signals for generating an output indicative of the presence of either one of said input signals; and binary divider means, having a first input responsive to said OR gate output signal and a reset input responsive to said AND gate output signal, for generating said circuit means output signal.

19. A system as in claim 15 wherein said current switch means comprises:

a pair of error transistors and a current source transistor connected to the emitters of said error transistors;

the control terminals of said error transistors adapted to receive signals from said logic means;

said error transistors having first and second output terminals for transmitting respective electrical signals of mutually opposite phase indicative of said relative occurrence of said input signals; and said current source transistor having an input responsive to said circuit means output signal and supplying current to said error transistors for the duration of said signal.

* * * * *